(12) United States Patent
Lin et al.

(10) Patent No.: US 10,016,859 B2
(45) Date of Patent: Jul. 10, 2018

(54) MANUFACTURING METHOD OF THERMAL MODULE ASSEMBLING STRUCTURE

(71) Applicant: ASIA VITAL COMPONENTS CO., LTD., New Taipei (TW)

(72) Inventors: Sheng-Huang Lin, New Taipei (TW); Kuo-Sheng Lin, New Taipei (TW)

(73) Assignee: ASIA VITAL COMPONENTS CO., LTD., New Taipai (TW)

( * ) Notice: Subject to any disclaimer, the term of this patent is extended or adjusted under 35 U.S.C. 154(b) by 118 days.

(21) Appl. No.: 15/060,611

(22) Filed: Mar. 4, 2016

(65) Prior Publication Data
US 2017/0252878 A1    Sep. 7, 2017

(51) Int. Cl.
*B23P 15/26* (2006.01)

(52) U.S. Cl.
CPC .......... *B23P 15/26* (2013.01); *B23P 2700/09* (2013.01)

(58) Field of Classification Search
CPC .............. B23P 15/26; Y10T 29/49353; Y10T 29/49364; Y10T 29/49913; Y10T 29/49922; Y10T 29/49925; Y10T 29/49936
See application file for complete search history.

(56) References Cited

U.S. PATENT DOCUMENTS

| | | | | |
|---|---|---|---|---|
| 3,779,311 | A * | 12/1973 | O'Connor | B21D 53/02 165/171 |
| 4,052,590 | A * | 10/1977 | Anderl | A47J 27/004 165/171 |
| 2011/0162206 | A1 * | 7/2011 | Chen | B23P 11/00 29/890.046 |
| 2012/0222839 | A1 * | 9/2012 | Huang | F28D 15/0233 165/104.26 |

* cited by examiner

*Primary Examiner* — Jason L Vaughan
*Assistant Examiner* — Amanda Meneghini
(74) *Attorney, Agent, or Firm* — Jackson IPG PLLC; Demian K. Jackson

(57) ABSTRACT

A manufacturing method of thermal module assembling structure includes a step of making a heat pipe received in a channel of a base seat tightly fitted and inserted in the channel by means of mechanical processing so as to integrally connect the base seat with the heat pipe. The manufacturing method of thermal module assembling structure is able to effectively enhance the connection strength between the base seat and the heat pipe.

6 Claims, 11 Drawing Sheets

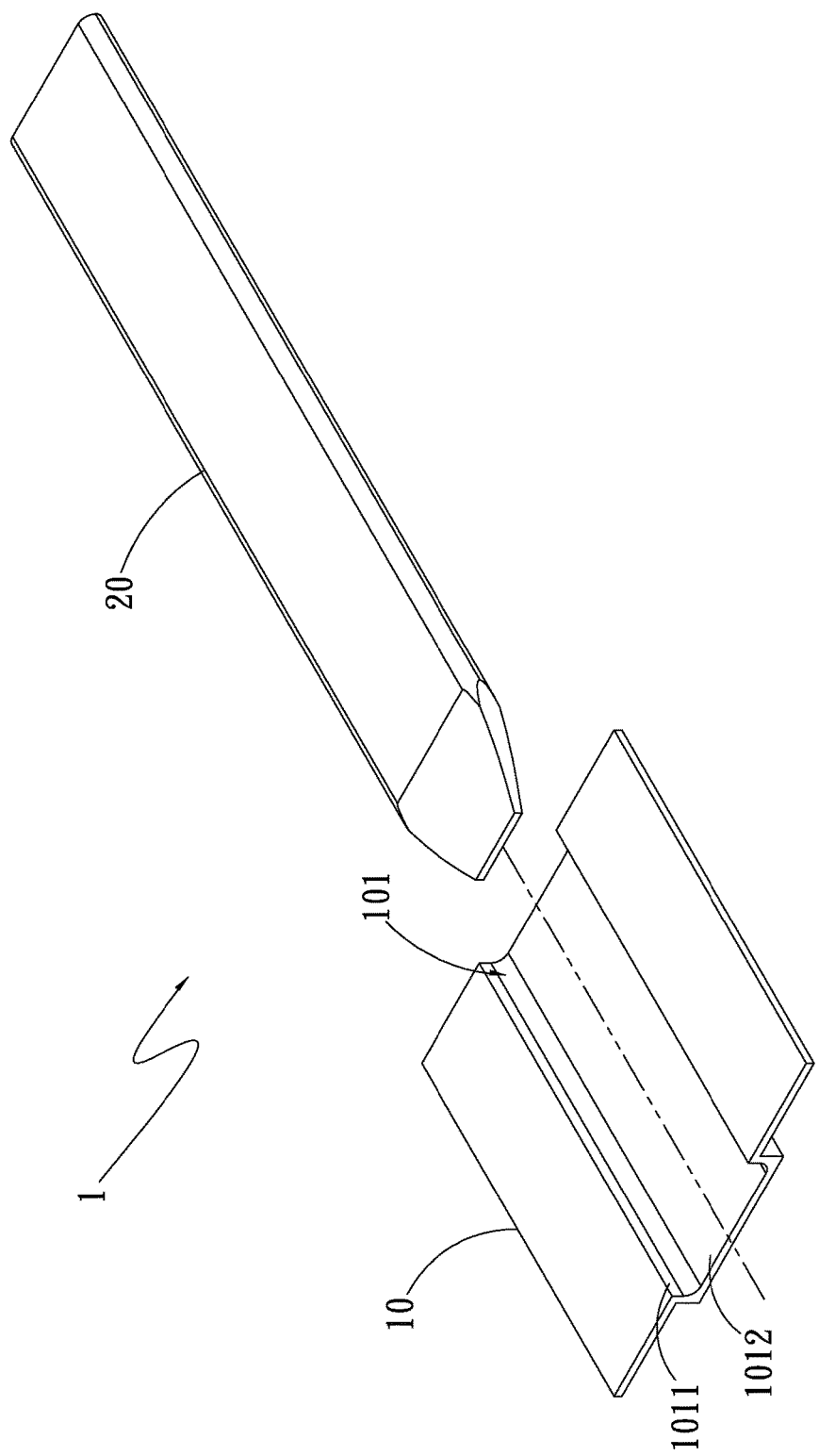

MANUFACTURING METHOD OF THERMAL MODULE ASSEMBLING STRUCTURE

BACKGROUND OF THE INVENTION

1. Field of the Invention

The present invention relates generally to a thermal module, and more particularly to a manufacturing method of a thermal module assembling structure, which can enhance the connection strength between the base seat and the heat pipe and save the cost.

2. Description of the Related Art

It is known that the functions of various electronic equipments have become stronger and stronger. As a result, the heat dissipation effect for the electronic equipments is more and more enhanced. All the current thermal module manufacturers have actively researched and developed more efficient thermal modules for the electronic equipments. Moreover, the central processing unit (CPU) of the electronic equipments has gone to an age of multi-core performance. Therefore, the product quality and heat dissipation efficiency of the entire thermal module have encountered severer limitation and test.

It is a mainstream in the field to apply heat pipe technique to thermal module. In general, the conventional heat pipe is connected with the base seat by means of press fit. One end of the heat pipe is tightly fitted in a corresponding channel formed on the base seat and integrally connected with the base seat. The conventional connection method is able to connect the base seat with the heat pipe. However, the connection strength between the base seat and the heat pipe is poor. This is because the heat pipe and the channel of the base seat are both directed in the same axial direction (longitudinal direction). Therefore, in case the heat pipe is pulled by an axial external force, the end of the heat pipe is apt to detach from the base seat and damage.

It is therefore tried by the applicant to provide a manufacturing method of thermal module assembling structure, which can enhance the connection strength between the base seat and the heat pipe.

SUMMARY OF THE INVENTION

It is therefore a primary object of the present invention to provide a manufacturing method of thermal module assembling structure, which can enhance the connection strength between the base seat and the heat pipe.

It is a further object of the present invention to provide the above manufacturing method of thermal module assembling structure, which can save the cost.

To achieve the above and other objects, the manufacturing method of thermal module assembling structure of the present invention includes steps of: providing a base seat with a channel and a heat pipe; and making one end of the heat pipe received in the channel and mechanically processing one side of the base seat in adjacency to the channel to form at least one hole, when the hole is formed, due to the pushing or extrusion of the hole, at least one protrusion section being correspondingly formed on at least one lateral inner wall of the channel, also, due to the pushing or deformation of the protrusion section, at least one insertion recess being correspondingly formed on one end of the heat pipe, the protrusion section being tightly fitted and inserted in the corresponding insertion recess to integrally connect the heat pipe with the base seat. By means of the manufacturing method of the present invention, the radial and axial connection strength between the base seat and the heat pipe is enhanced and the cost is saved.

In the above manufacturing method of thermal module assembling structure, the channel further has an open side, a closed side opposite to the open side and at least one projecting claw section. One side of one end of the heat pipe is tightly attached to the closed side of the channel. The other side of the end of the heat pipe is flush with the open side of the channel and one side of the base seat. The projecting claw section outward projects from one end of the channel in adjacency to one side of the base seat. The projecting claw section is tightly and correspondingly attached to the outer side of the end of the heat pipe.

In the above manufacturing method of thermal module assembling structure, the mechanical processing is rolling processing. In the rolling processing, a roller with at least one raised body is rolled on one side of the base seat from one end to the other opposite end. The surface of the roller is attached to one side of one end of the heat pipe to plane the heat pipe. The raised body of the roller is positioned on one side of the base seat in adjacency to the channel to roll and form the hole.

In the above manufacturing method of thermal module assembling structure, the mechanical processing is pressing processing. In the pressing processing, a press mold with at least one raised body is pressed against one side of the base seat. The raised body of the press mold presses one side of the base seat in adjacency to the channel to form the hole.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 1 is a perspective exploded view of a first embodiment of the present invention;

DETAILED DESCRIPTION OF THE PREFERRED EMBODIMENTS

Figure 2A:
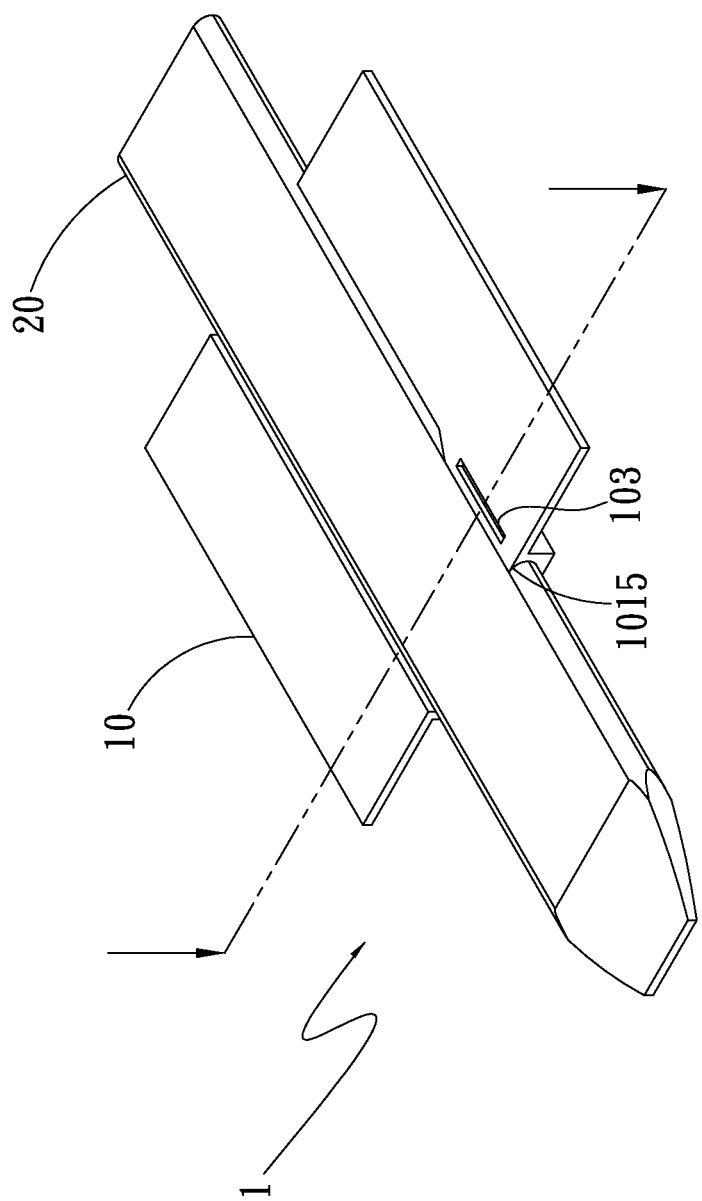
FIG. 2A is a perspective assembled view of the first embodiment of the present invention.
Figure 2B:
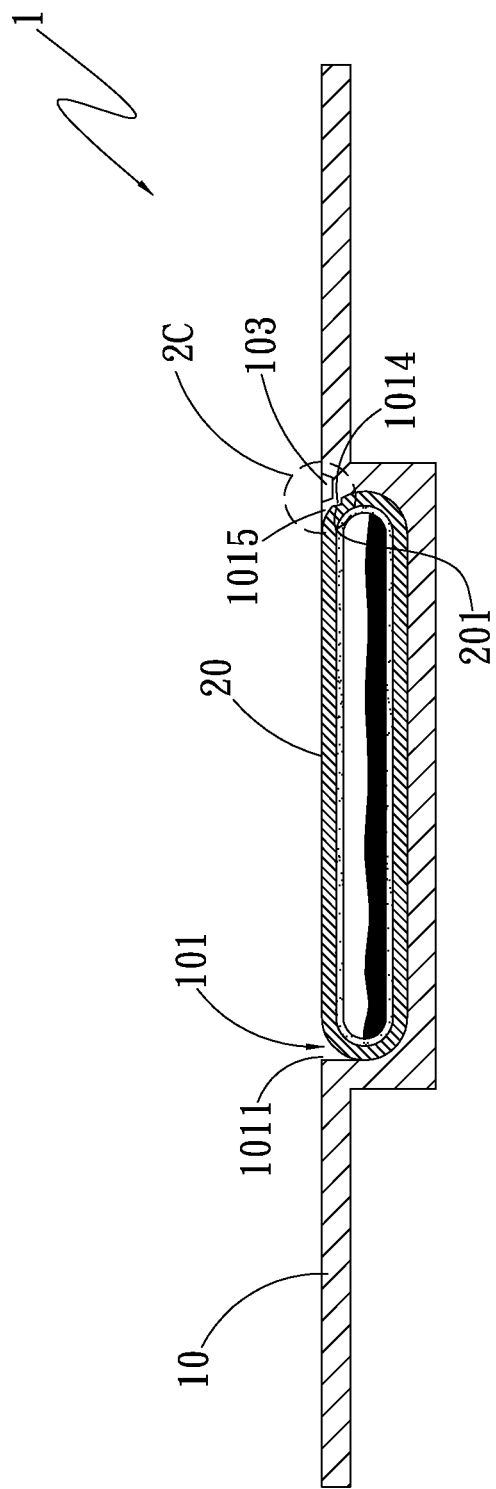
FIG. 2B is a sectional assembled view of the first embodiment of the present invention.
Figure 2C:
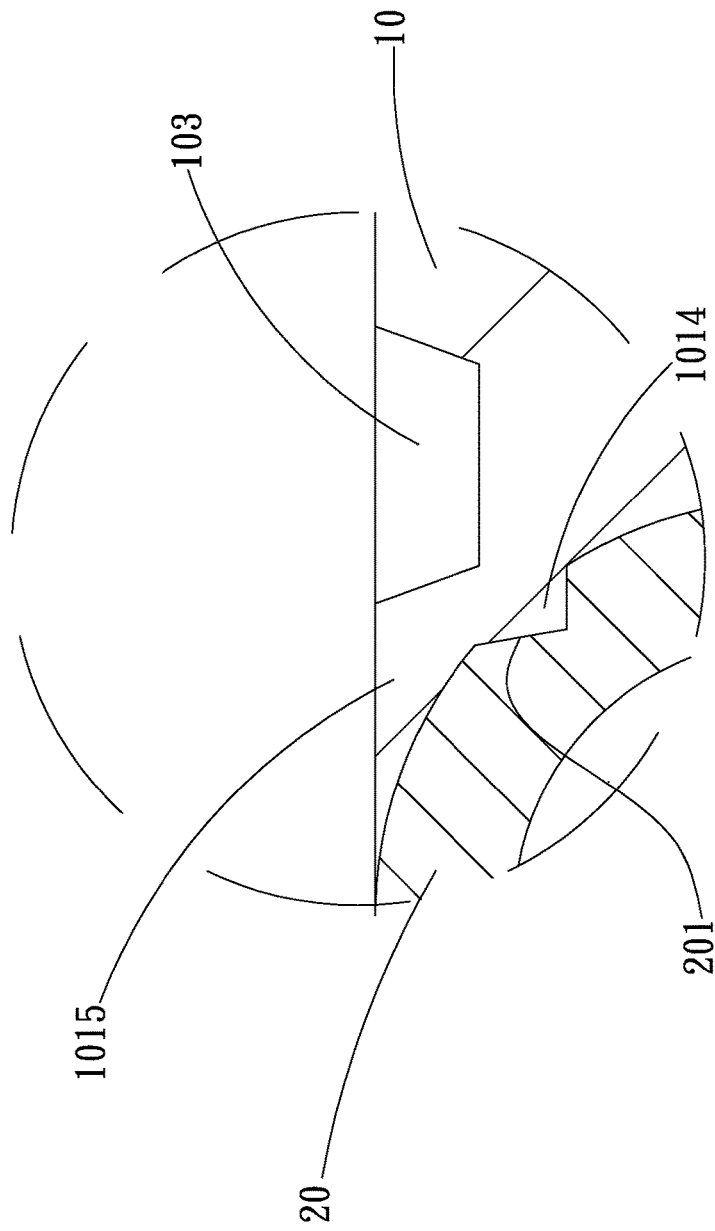
FIG. 2C is an enlarged view of circled area 2B of FIG. 2B.

Please refer to FIGS. 1, 2A, 2B and 2C. FIG. 1 is a perspective exploded view of a first embodiment of the present invention. FIG. 2A is a perspective assembled view of the first embodiment of the present invention. FIG. 2B is a sectional assembled view of the first embodiment of the present invention. FIG. 2C is an enlarged view of circled area 2B of FIG. 2B. According to the first embodiment, the thermal module assembling structure 1 of the present invention includes a base seat 10 and a heat pipe 20. The base seat 10 is formed with a channel 101 and at least one hole 103. The channel 101 is recessed and formed on one side of the base seat 10 for correspondingly receiving one end of the heat pipe 20. The channel 101 has at least one protrusion section 1014, an open side 1011, a closed side 1012 and at least one projecting claw section 1015. The open side 1011 is opposite to the closed side 1012. The open side 1011 and the closed side 1012 together define the channel 101. In this embodiment, there are, but not limited to, one protrusion section 1014 and one cooperative projecting claw section 1015 for illustration purposes only. In practice, according to the structural strength of the base seat 10 and the heat pipe 20 and the size of the base seat 10, the numbers of the protrusion section 1014 and the projecting claw section 1015 can be previously adjusted.

The protrusion section 1014 protrudes from a lateral inner wall of the channel 101. That is, the protrusion section 1014 is integrally formed on the lateral inner wall of the channel 101 and protrudes therefrom. The projecting claw section 1015 outward projects from one end of the channel 101 in adjacency to one side of the base seat 10. The projecting claw section 1015 tightly correspondingly attaches to outer side of the end of the heat pipe 20. In this embodiment, there are, but not limited to, one hole 103 and one cooperative protrusion section 1014 and one cooperative projecting claw section 1015 for illustration purposes only. The hole 103 is recessed and formed on one side of the base seat 10 in adjacency to the channel 101 corresponding to the protrusion section 1014 formed on the lateral inner wall of the channel 101. That is, the hole 103 is formed on one side of the base seat 10 in adjacency to the channel 101 by means of mechanical processing (such as rolling or pressing). At the same time, due to the pushing (or extrusion) of the hole 103, the protrusion section 1014 will protrude from the lateral inner wall of the channel 101 corresponding to the hole 103. Also, the projecting claw section 1015 outward projects from one end of the channel 101 in adjacency to the hole 103 (as shown in FIGS. 3A and 3B).

Figure 3A:
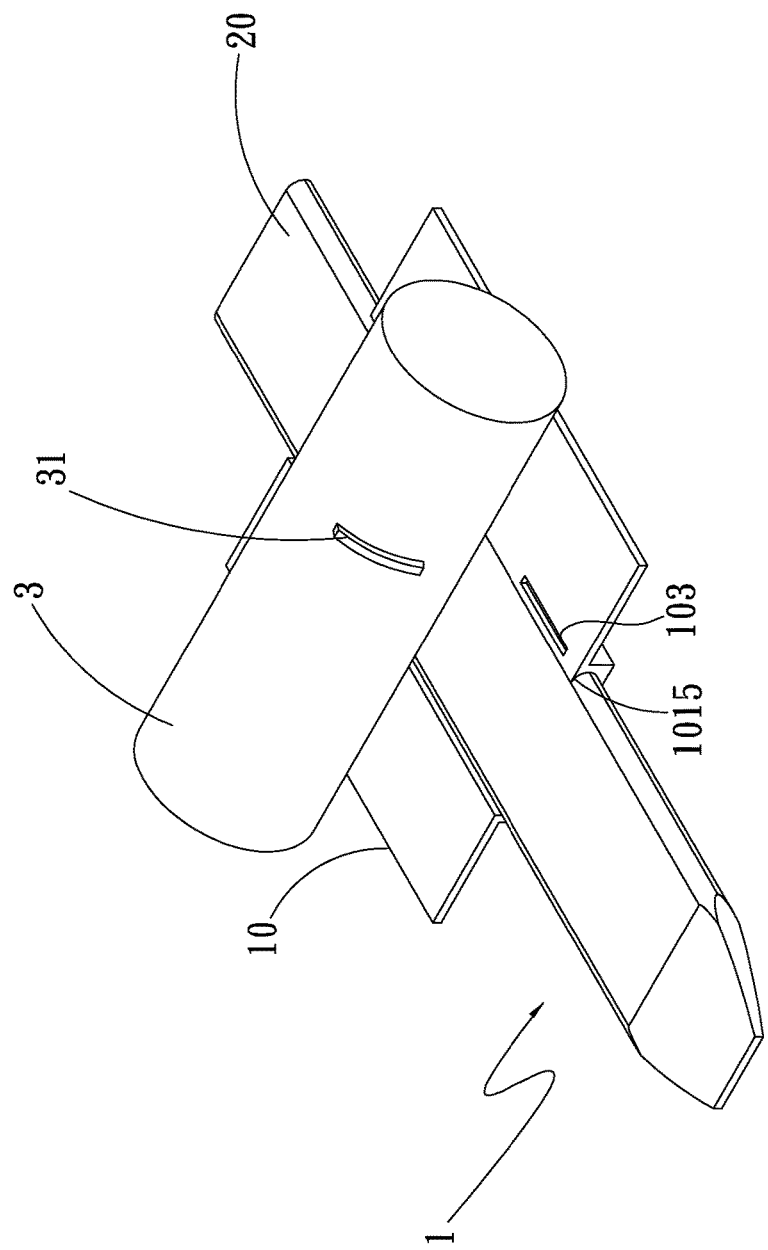
FIG. 3A shows the mechanical processing of the first embodiment of the present invention in one aspect.
Figure 3B:
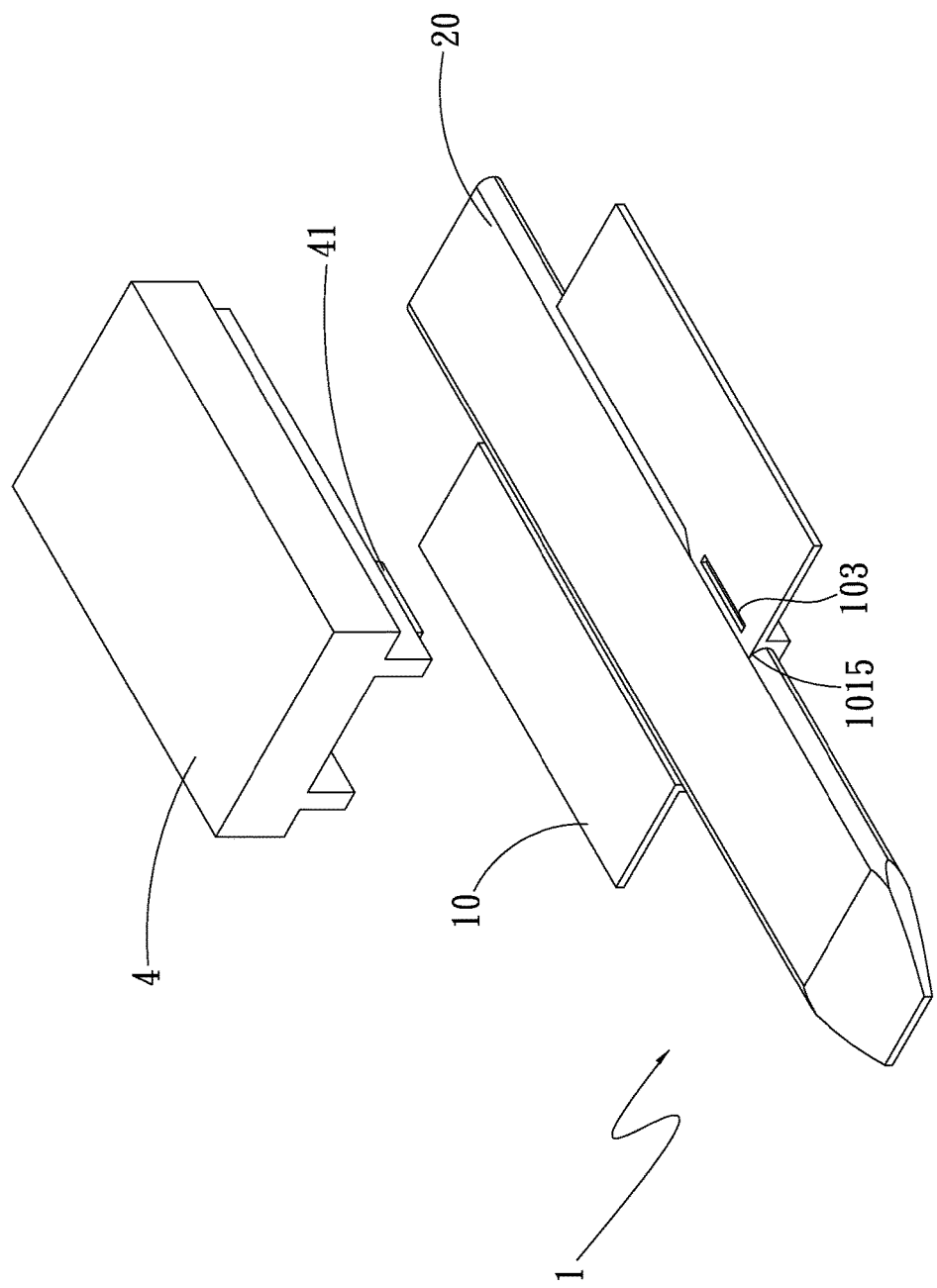
FIG. 3B shows the mechanical processing of the first embodiment of the present invention in another aspect.

Please now refer to FIGS. 2B and 2C and supplementally to FIG. 3A or 3B. In this embodiment, the heat pipe 20 is, but not limited to, a flat-plate heat pipe for illustration purposes only. Alternatively, the heat pipe 20 can be a substantially D-shaped heat pipe 20. One end of the heat pipe 20 is received in the channel 101. That is, one side of one end of the heat pipe 20 is tightly attached to the closed side 1012 of the channel 101. The other side of the end of the heat pipe 20 is flush with the open side 1011 of the channel 101, one side of the base seat 10 and the projecting claw section 1015. The heat pipe 20 has at least one insertion recess 201. The insertion recess 201 is recessed and formed on outer side of the end of the heat pipe 20. The protrusion section 1014 is tightly and integrally fitted and inserted in the insertion recess 201. In other words, when the protrusion section 1014 protrudes from the lateral inner wall of the channel 101 corresponding to the hole 103 due to the pushing (or extrusion) of the hole 103, the outer side of the end of the heat pipe 20 will be also recessed to form the insertion recess 201 corresponding to the protrusion section 1014 due to the pushing (or extrusion) of the protrusion section 1014. Under such circumstance, the protrusion section 1014 of the base seat 10 is tightly fitted and inserted in the insertion recess 201 of the heat pipe 20. Also, the projecting claw section 1015 is tightly attached to the outer side of the end of the heat pipe 20 and integrally connected therewith. In short, the base seat 10 is integrally connected with the heat pipe 20.

According to the above arrangement, the hole 103 is formed on one side of the base seat 10 in adjacency to the channel 101 by means of mechanical processing. At the same time, the protrusion section 1014 protrudes from the lateral inner wall of the channel 101 corresponding to the hole 103 and the projecting claw section 1015 outward projects from one end of the channel 101 in adjacency to the hole 103. The protrusion section 1014 is tightly and integrally fitted and inserted in the insertion recess 201 of the heat pipe 20. Also, the projecting claw section 1015 is tightly attached to the outer side of the end of the heat pipe 20 and integrally connected therewith. Under such circumstance, the base seat 10 will interfere with the outer side of the heat pipe 20 fitted in the channel 101. The interference force is normal to the axial direction of the heat pipe 20. Therefore, the heat pipe 20 is prevented from detaching out of the channel 101 of the base seat 10 in the longitudinal direction of the channel 101 (in parallel to the axial direction of the heat pipe 20). Moreover, the radial and axial connection strength between the base seat 10 and the heat pipe 20 is effectively enhanced. Also, the base seat 10 and the heat pipe 20 are connected with each other without using any additional welding material. Therefore, in comparison with the conventional thermal module, the present invention can save the cost.

In addition, in this embodiment, the heat pipe 20 is first received in the channel 101 without press fit. Then, the protrusion section 1014 of the channel 101 is inserted and connected in the corresponding insertion recess 201 and the projecting claw section 1015 is tightly attached to the corresponding outer side of the end of the heat pipe 20, whereby the connection strength between the heat pipe 20 and the base seat 10 is enhanced. However, the connection between the heat pipe 20 and the base seat 10 is not limited to the above embodiment. In practice, the heat pipe 20 can be alternatively received in the channel 101 by press fit. Then, the protrusion section 1014 of the channel 101 is inserted and connected in the corresponding insertion recess 201 and the projecting claw section 1015 is tightly attached to the corresponding outer side of the end of the heat pipe 20, whereby the connection strength between the heat pipe 20 and the base seat 10 is enhanced.

Figure 4A:
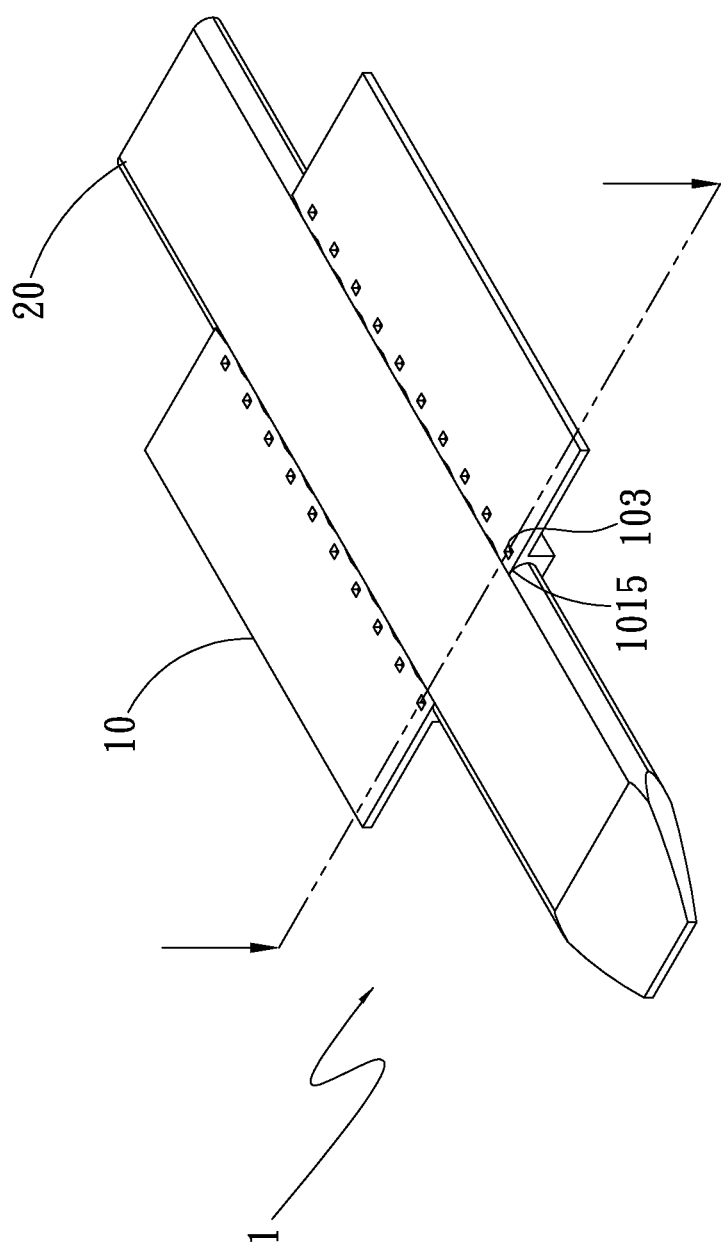
FIG. 4A is a perspective assembled view of a second embodiment of the present invention.
Figure 4B:
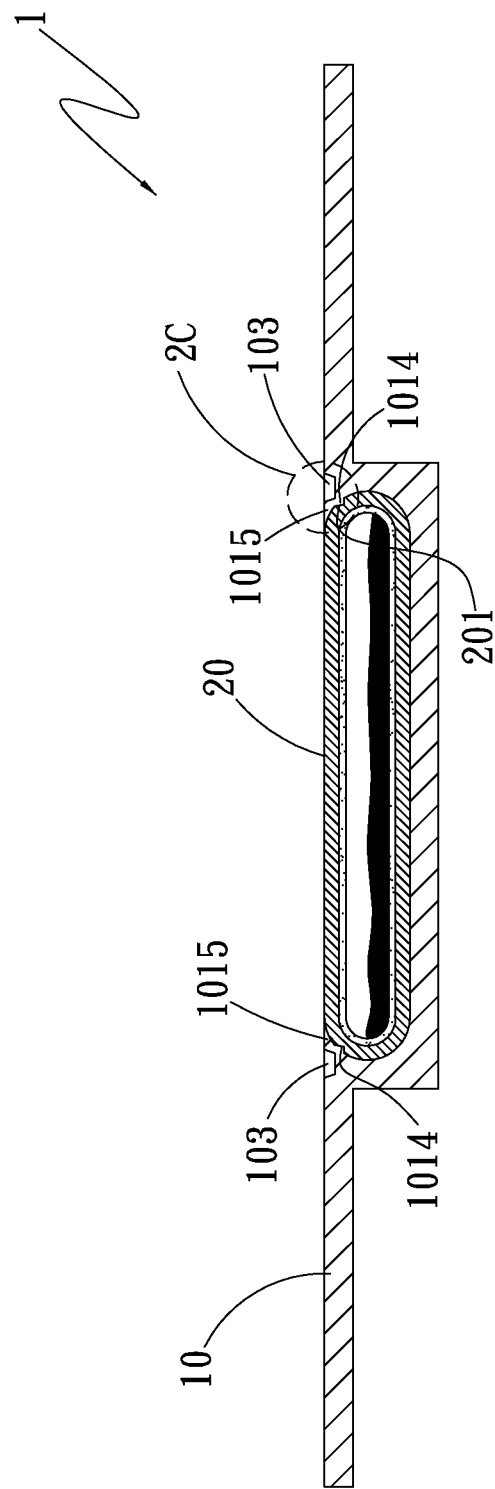
FIG. 4B is a sectional assembled view of the second embodiment of the present invention.

Please now refer to FIGS. 4A and 4B. FIG. 4A is a perspective assembled view of a second embodiment of the present invention. FIG. 4B is a sectional assembled view of the second embodiment of the present invention. Please also supplementally refer to FIGS. 1, 2C, 5A and 5B. The second embodiment is substantially identical to the first embodiment in structure, connection relationship and effect and thus will not be repeatedly described hereinafter. The second embodiment is different from the first embodiment in that in the second embodiment, there are multiple holes 103 and multiple cooperative protrusion sections 1014 and multiple cooperative projecting claw sections 1015 for illustration purposes only. The holes 103 are formed on one side of the base seat 10 in adjacency to the channel 101 by means of mechanical processing (such as rolling or pressing). At the same time, due to the pushing (or extrusion) of the holes 103, the protrusion sections 1014 will protrude from the lateral inner wall of the channel 101 corresponding to the holes 103. Also, the projecting claw sections 1015 will outward project from the opposite end of the channel 101 in adjacency to the holes 103, (that is, the opposite end of the channel 101 on the open side 1011). In addition, the outer side of the end of the heat pipe 20 in the channel 101 will be also recessed to form multiple insertion recesses 201 due to the pushing (or extrusion) of the protrusion sections 1014. Under such circumstance, the protrusion sections 1014 of the base seat 10 are tightly fitted and inserted in the corresponding insertion recesses 201 of the heat pipe 20. Also, the projecting claw sections 1015 are tightly attached to the outer side of the end of the heat pipe 20 and integrally connected therewith. The holes 103 formed on one side of the base seat 10 in adjacency to two sides of the channel 101 correspond to the protrusion sections 1014 formed on the lateral inner wall of the channel 101.

According to the above arrangement, the protrusion sections 1014 of the base seat 10 are integrally formed on the corresponding lateral inner wall of the channel 101 and protrude from the lateral inner wall. The protrusion sections 1014 are tightly fitted and inserted in the corresponding insertion recesses 201 of the heat pipe 20. Also, the projecting claw sections 1015 are tightly attached to the corresponding outer side of the end of the heat pipe 20. Therefore, the connection strength between the base seat 10 and the heat pipe 20 is enhanced and the cost is saved.

Figure 6:
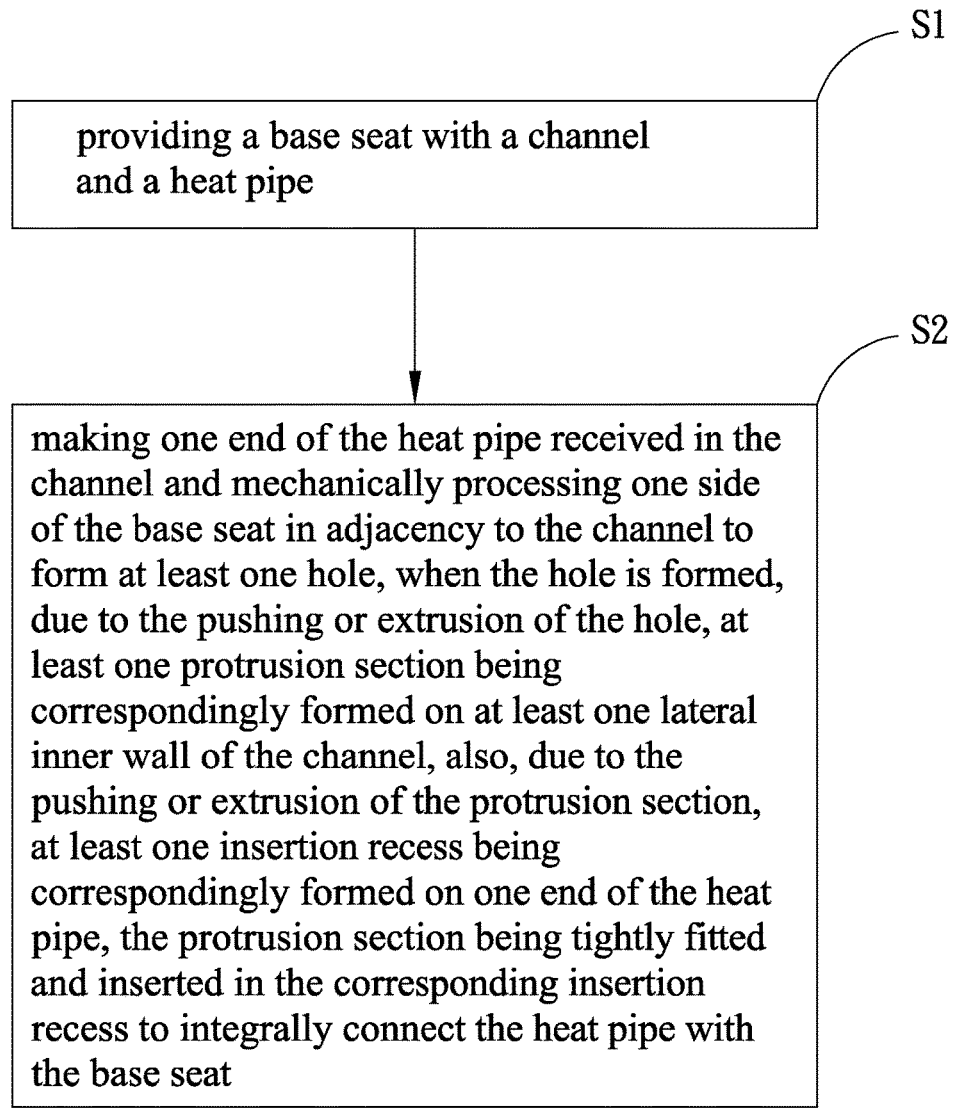
FIG. 6 is a flow chart of the manufacturing method of the present invention.

Please refer to FIG. 6, which is a flow chart of the manufacturing method of the present invention. Please also supplementally refer to FIGS. 2A, 2B, 4A and 4B. The manufacturing method of the thermal module assembling structure 1 of the present invention includes steps of:

S1. providing a base seat with a channel and a heat pipe, a base seat 10 and a heat pipe 20 being provided, the base seat 10 having a channel 101; and S2. making one end of the heat pipe received in the channel and mechanically processing one side of the base seat in adjacency to the channel to form at least one hole, when the hole is formed, due to the pushing or extrusion of the hole, at least one protrusion section being correspondingly formed on at least one lateral inner wall of the channel, also, due to the pushing or extrusion of the protrusion section, at least one insertion recess being correspondingly formed on one end of the heat pipe, the protrusion section being tightly fitted and inserted in the corresponding insertion recess to integrally connect the heat pipe with the base seat, one end of the heat pipe 20 being received in the channel 101, one side of the base seat 10 in adjacency to the channel 101 being mechanically processed in four manners as follows:

In the first manner, there are one hole 103 and one cooperative protrusion section 1014 and one cooperative projecting claw section 1015. The roller 3 is formed with one raised body 31 as shown in FIGS. 2B, 2C and 3A. The mechanical processing applied to one side of the base seat 10 in adjacency to the channel 101 is rolling processing. In the rolling processing, a roller 3 with at least one raised body 31 is rolled on one side of the base seat 10 from one end to the other opposite end. The surface of the roller 3 is attached to one side of one end of the heat pipe 20 to plane the heat pipe 20. The raised body 31 of the roller 3 is positioned on one side of the base seat 10 in adjacency to the channel 101 to roll and form the hole 103. At the same time, due to the pushing (or extrusion) of the hole 103, the protrusion section 1014 will protrude from the lateral inner wall of the channel 101 corresponding to the hole 103. Also, the projecting claw section 1015 will outward project from one end of the channel 101 in adjacency to the hole 103. In addition, the outer side of the end of the heat pipe 20 in the channel 101 will be also recessed to form the insertion recess 201 corresponding to the protrusion section 1014 due to the pushing (or extrusion) of the protrusion section 1014. Under such circumstance, the protrusion section 1014 of the base seat 10 is tightly fitted and inserted in the insertion recess 201 of the heat pipe 20. Also, the projecting claw section 1015 is tightly attached to the outer side of the end of the heat pipe 20 and integrally connected therewith. The number of the insertion recess 201 is equal to the number of the protrusion section 1014.

The second manner is substantially identical to the first manner. The second manner is mainly different from the first manner in that the mechanical processing of the second manner is different from that of the first manner. As shown in FIGS. 2B, 2C and 3B. In the second manner, there are one hole 103 and one cooperative protrusion section 1014 and one cooperative projecting claw section 1015. The press mold 4 has one raised body 41. That is, the mechanical processing applied to one side of the base seat 10 in adjacency to the channel 101 is pressing processing. In the pressing processing, a press mold 4 with at least one raised body 41 is pressed against one side of the base seat 10. The raised body 41 of the press mold 4 presses one side of the base seat 10 in adjacency to the channel 101 to form the hole 103. At the same time, due to the pushing (or extrusion) of the hole 103, the protrusion section 1014 will protrude from the lateral inner wall of the channel 101 corresponding to the hole 103. Also, the projecting claw section 1015 will outward project from one end of the channel 101 in adjacency to the hole 103. In addition, the outer side of the end of the heat pipe 20 in the channel 101 will be also recessed to form the insertion recess 201 corresponding to the protrusion section 1014 due to the pushing (or extrusion) of the protrusion section 1014. Under such circumstance, the protrusion section 1014 of the base seat 10 is tightly fitted and inserted in the insertion recess 201 of the heat pipe 20. Also, the projecting claw section 1015 is tightly attached to the outer side of the end of the heat pipe 20 and integrally connected therewith. The number of the insertion recess 201 is equal to the number of the protrusion section 1014. The shape of the raised body 41 of the press mold 4 is selected from a group consisting of toothed-column-shape, circular shape, triangular shape and rectangular shape.

Figure 5A:
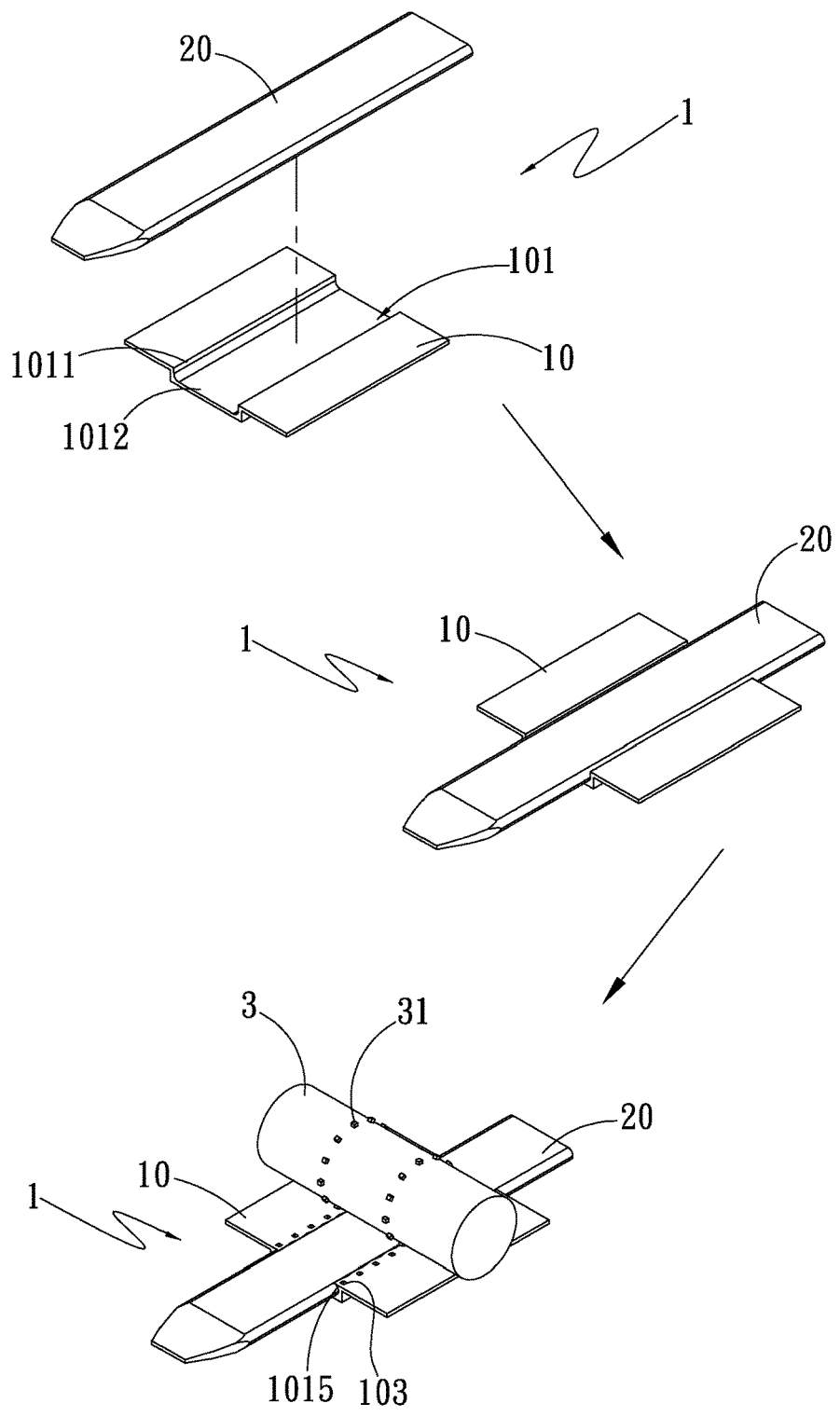
FIG. 5A shows the mechanical processing of the second embodiment of the present invention in one aspect.

The third manner is substantially identical to the first manner. The third manner is mainly different from the first manner in that in the third manner, there are a plurality of holes 103 and a plurality of cooperative protrusion section 1014 and a plurality of cooperative projecting claw section 1015 as shown in FIGS. 4B and 5A. The roller 3 is formed with two rows of raised bodies 31 arranged in parallel to each other. The raised bodies 31 are correspondingly positioned on one side of the base seat 10 in adjacency to two sides of the channel 101. In the rolling processing, the roller 3 with the multiple raised bodies 31 is rolled on the side of the base seat 10 to form the multiple holes 103. At the same time, due to the pushing (or extrusion) of the holes 103, the multiple protrusion sections 1014 will protrude from the lateral inner wall of the channel 101 corresponding to the holes 103. Also, the multiple projecting claw sections 1015 will outward project from the opposite end of the channel 101 in adjacency to the holes 103, (that is, the opposite end of the channel 101 on the open side 1011). In addition, the outer side of the end of the heat pipe 20 in the channel 101 will be also recessed to form multiple insertion recesses 201 due to the pushing (or extrusion) of the protrusion sections 1014. In addition, the outer side of the end of the heat pipe 20 in the channel 101 will be also recessed to form the multiple insertion recesses 201 corresponding to the protrusion section 1014 due to the pushing (or extrusion) of the protrusion sections 1014. Under such circumstance, the multiple protrusion sections 1014 of the base seat 10 are tightly fitted and inserted in the corresponding insertion recesses 201 of the heat pipe 20. Also, the multiple projecting claw sections 1015 are tightly attached to the outer side of the end of the heat pipe 20 and integrally connected therewith. The number of the insertion recesses 201 is equal to the number of the protrusion sections 1014.

Figure 5B:
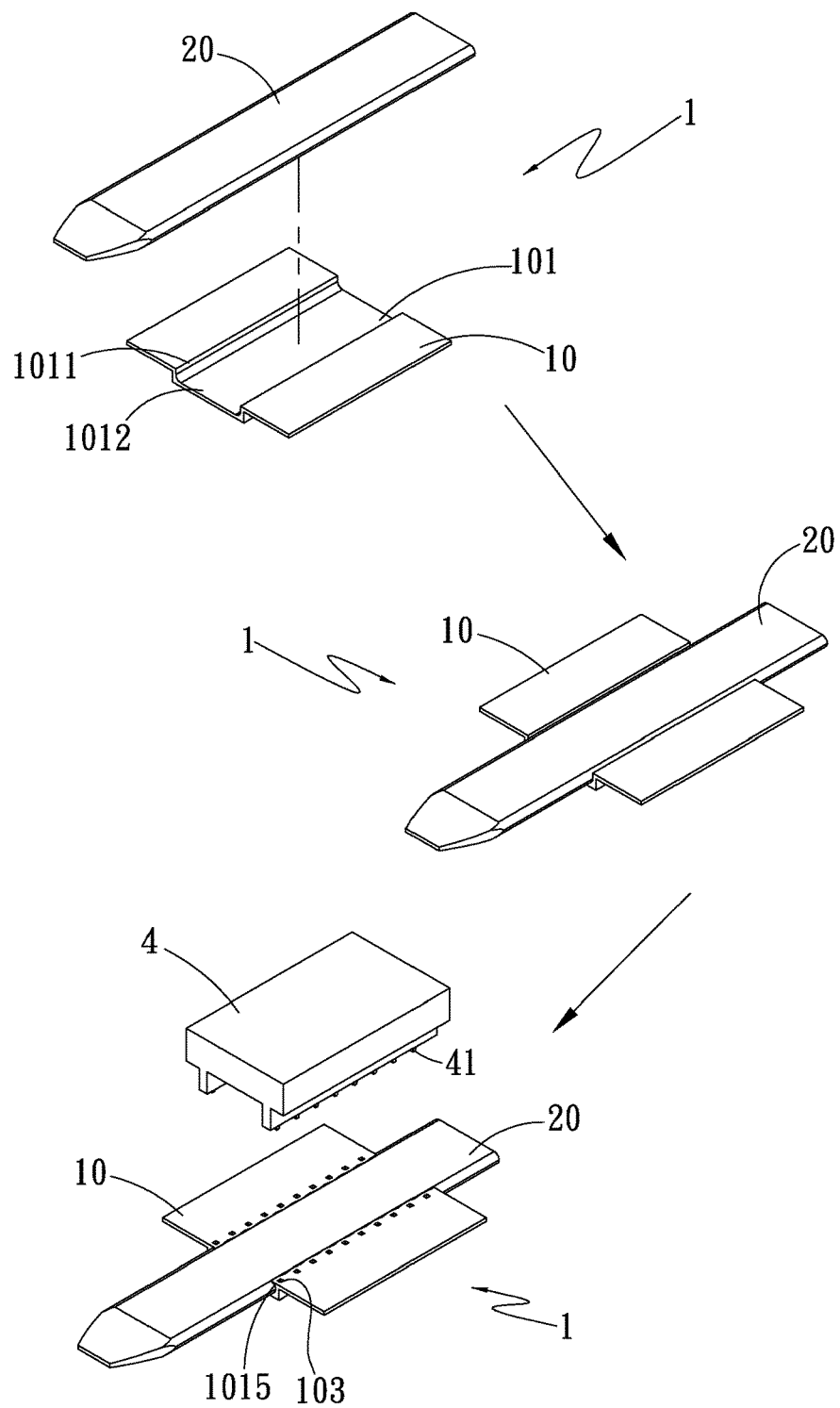
FIG. 5B shows the mechanical processing of the second embodiment of the present invention in another aspect.

The fourth manner is substantially identical to the second manner. The fourth manner is mainly different from the second manner in that in the fourth manner, there are a plurality of holes 103 and a plurality of cooperative protrusion section 1014 and a plurality of cooperative projecting claw section 1015 as shown in FIGS. 4B and 5B. The press mold 4 is formed with two rows of raised bodies 41 arranged in parallel to each other. The raised bodies 41 are correspondingly positioned on one side of the base seat 10 in adjacency to two sides of the channel 101. In the pressing processing, the press mold 4 with the multiple raised bodies 41 is pressed against the side of the base seat 10 to form the multiple holes 103. At the same time, due to the pushing (or extrusion) of the holes 103, the multiple protrusion sections 1014 will protrude from the lateral inner wall of the channel 101 corresponding to the holes 103. Also, the multiple projecting claw section 1015 will outward project from the opposite end of the channel 101 in adjacency to the holes 103, (that is, the opposite end of the channel 101 on the open side 1011). In addition, the outer side of the end of the heat pipe 20 in the channel 101 will be also recessed to form the multiple insertion recesses 201 corresponding to the protrusion sections 1014 due to the pushing (or extrusion) of the protrusion sections 1014. Under such circumstance, the protrusion sections 1014 of the base seat 10 are tightly fitted and inserted in the corresponding insertion recesses 201 of the heat pipe 20. Also, the projecting claw sections 1015 are tightly attached to the outer side of the end of the heat pipe 20 and integrally connected therewith. The number of the insertion recesses 201 is equal to the number of the protrusion sections 1014. The shape of the raised body 41 of the press mold 4 is selected from a group consisting of toothed-column-shape, circular shape, triangular shape and rectangular shape.

According to the above arrangement, the manufacturing method of the thermal module assembling structure of the present invention can effectively enhance the connection strength between the base seat 10 and the heat pipe 20 and save the cost.

In conclusion, in comparison with the conventional thermal module, the present invention has the following advantages:

1. The connection strength between the base seat and the heat pipe is enhanced.
2. The cost is saved.

The present invention has been described with the above embodiments thereof and it is understood that many changes and modifications in the above embodiments can be carried out without departing from the scope and the spirit of the invention that is intended to be limited only by the appended claims.

What is claimed is:

1. A manufacturing method of thermal module assembling structure comprising steps of:
   providing a base seat with a channel and an elongate heat pipe defining a longitudinal direction and length; and
   placing a first end of the heat pipe in the channel and mechanically processing a first side of the base seat in adjacency to the channel to form at least one hole extending only partially along a longitudinal length of the channel and at least one protrusion section extending only partially along the longitudinal length of the channel and protruding from at least one lateral inner wall of the channel and such that at least one corresponding insertion recess extending only partially along the longitudinal length of the channel is formed on the first end of the heat pipe, wherein the protrusion section is fitted and inserted in the corresponding insertion recess to integrally connect the heat pipe with the base seat so as to form an interference fit between the base seat and the elongate heat pipe and so as to restrain relative movement in the longitudinal direction therebetween.

2. The manufacturing method of thermal module assembling structure as claimed in claim 1, wherein the channel further has an open side, a closed side opposite to the open side and at least one projecting claw section adjacent the protrusion section, a first side of the first end of the heat pipe being attached to the closed side of the channel, the other side of the first end of the heat pipe being flush with the open side of the channel and the first side of the base seat, the projecting claw section projecting from a first end of the channel in adjacency to the first side of the base seat and attached to the first end of the heat pipe.

3. The manufacturing method of thermal module assembling structure as claimed in claim 1, wherein the mechanical processing is rolling processing, in the rolling processing, a roller with at least one raised body being rolled on one side of the base seat from one end to the other opposite end, a surface of the roller being attached to one side of one end of the heat pipe to plane the heat pipe, the raised body of the roller being positioned on one side of the base seat in adjacency to the channel to roll and form the hole.

4. The manufacturing method of thermal module assembling structure as claimed in claim 1, wherein the mechanical processing is pressing processing wherein a press mold with at least one raised body extending only partially along the longitudinal length of the channel is pressed against the first side of the base seat, the raised body of the press mold pressing the first side of the base seat in adjacency to the channel to form the hole.

5. The manufacturing method of thermal module assembling structure of claim 1, wherein the protrusion section is an angular shape and the corresponding insertion recess is a corresponding angular shape.

6. The manufacturing method of thermal module assembling structure of claim 5, wherein the protrusion section is trapezoidal in cross-section and the corresponding insertion recess is correspondingly trapezoidal in cross-section.

* * * * *